(12) United States Patent
Rahm et al.

(10) Patent No.: US 12,508,915 B2
(45) Date of Patent: Dec. 30, 2025

(54) METHOD OF CONTROLLING AN ELECTRIC POWER SOURCE

(71) Applicant: Volvo Truck Corporation, Gothenburg (SE)

(72) Inventors: Fredrik Rahm, Hörby (SE); Fredrik Larsson, Vellinge (SE)

(73) Assignee: Volvo Truck Corporation, Gothenburg (SE)

( * ) Notice: Subject to any disclaimer, the term of this patent is extended or adjusted under 35 U.S.C. 154(b) by 204 days.

(21) Appl. No.: 18/479,874

(22) Filed: Oct. 3, 2023

(65) Prior Publication Data

US 2024/0123829 A1 Apr. 18, 2024

(30) Foreign Application Priority Data

Oct. 18, 2022 (EP) .................................... 22202139

(51) Int. Cl.
*B60L 3/00* (2019.01)
*B60L 1/00* (2006.01)
(Continued)

(52) U.S. Cl.
CPC ............. *B60L 3/0061* (2013.01); *B60L 1/003* (2013.01); *H02J 3/00125* (2020.01);
(Continued)

(58) Field of Classification Search
CPC .......... B60L 1/00; B60L 1/003; B60L 3/0061; B60L 50/60; B60L 2220/46; B60L 2240/421; B60L 2240/423; B60L 2240/425; H02J 1/14; H02J 3/00125; H02J 3/003; H02J 3/14; H02J 3/322; H02J 4/00; H02J 2300/30; H02J 2310/40
(Continued)

(56) References Cited

U.S. PATENT DOCUMENTS 5,507,153 A * 4/1996 Seto .................... B60H 1/00492
62/133
2003/0068538 A1* 4/2003 Lahiff ..................... B60L 58/30
429/430
(Continued)

FOREIGN PATENT DOCUMENTS

CN 107893772 A * 4/2018 ........... F04D 29/002
EP 2394837 A1 12/2011
WO 2019092337 A1 5/2019

OTHER PUBLICATIONS

Machine translation of Wang et al. Chinese Patent Document CN 107893772 A Apr. 2018 (Year: 2018).*
(Continued)

*Primary Examiner* — Kevin J Comber
(74) *Attorney, Agent, or Firm* — Withrow & Terranova, PLLC

(57) ABSTRACT

A method of controlling an electric power system, the method comprising determining, by a processor device of a computer system, a change in power consumption of a power consumer from a first power level to a second power level; and controlling, in response to determining the change in power consumption, an energy dissipater to receive electric power from an electric power source at a third power level, the third power level being a difference between the first power level and the second power level.

16 Claims, 8 Drawing Sheets

(51) Int. Cl.
*H02J 3/00* (2006.01)
*H02J 3/32* (2006.01)

(52) U.S. Cl.
CPC .............. *H02J 3/003* (2020.01); *H02J 3/322* (2020.01); *B60L 2220/46* (2013.01); *H02J 2300/30* (2020.01)

(58) Field of Classification Search
USPC ......................................................... 361/111
See application file for complete search history.

(56) References Cited

U.S. PATENT DOCUMENTS

| | | | |
|---|---|---|---|
| 2003/0102729 A1* | 6/2003 | Sanuki | H02K 11/33 310/58 |
| 2012/0121447 A1 | 5/2012 | Hayashi et al. | |
| 2014/0144412 A1 | 5/2014 | An et al. | |
| 2014/0342253 A1 | 11/2014 | Lee et al. | |
| 2017/0363024 A1 | 12/2017 | Sivaraman et al. | |

OTHER PUBLICATIONS

Extended European Search Report for European Patent Application No. 22202139.6, mailed Apr. 19, 2023, 8 pages.

* cited by examiner

METHOD OF CONTROLLING AN ELECTRIC POWER SOURCE

RELATED APPLICATIONS

The present application claims priority to European Patent Application No. 22202139.6, filed on Oct. 18, 2022, and entitled "METHOD OF CONTROLLING AN ELECTRIC POWER SOURCE," which is incorporated herein by reference in its entirety.

TECHNICAL FIELD

The inventive concept relates generally to electric power systems. In particular aspects, the inventive concept relates to a method of controlling an electric power system, as well as a corresponding electric power system. The inventive concept can be applied in heavy-duty vehicles, such as trucks, buses, and construction equipment. Although the inventive concept may be described with respect to a particular vehicle, the inventive concept is not restricted to any particular vehicle.

BACKGROUND

During operation of a loadbank, i.e., an electric power consumer in the form of e.g., a generator, motor, etc., the variation of load consumed by the electric power consumer may suddenly change due to e.g. a change in requested power by the electric power consumer.

When an electric power consumer is receiving electric power from an electric power source in the form of e.g., a wind turbine or a fuel cell, a problem may occur in that the electric power fed from such electric power source may not be able to rapidly respond to the change in load from the electric power consumer. Since the electric power source may not be able to fully follow the dynamic changes, there may be a risk that the electric power source is trying to feed electric power at a power level which is higher than the power level consumable by the electric power consumer.

It is therefore a desire to provide a solution which is able to manage rapid changes in power consumption from a power consumer.

SUMMARY

It is thus a desire of the present inventive concept to at least partially overcome the above-described deficiencies.

According to a first aspect, there is provided a method of controlling an electric power system, the electric power system comprising an electric power source, a power consumer electrically connected to the electric power source for consuming power received from the electric power source, and an energy dissipater electrically connected to the electric power source, wherein the energy dissipater comprises an air compressor operable by electric power from the electric power source to pressurize a flow of air, the method comprising determining, by a processor device of a computer system, a change in power consumption of the power consumer from a first power level to a second power level; and controlling in response to determining the change in power consumption, the energy dissipater to receive electric power from the electric power source at a third power level, the third power level being a difference between the first power level and the second power level.

The definition "electric power source" should preferably be construed as an arrangement configured to feed electric power. The electric power source may, for example, be a fuel cell generating electric power which can be fed to a power consumer. As a further example, the electric power source may be a generator of a wind turbine, whereby the generated electric power can be fed to a power consumer. As a still further example, the electric power source can be a battery. Thus, the electric power source should preferably be an arrangement configured to generate or receive electric power and feed such electric power to a power consumer. The power consumer on the other hand should be construed as a device which receives electric power for its operation. Thus, for the power consumer to operate, it consumes electric power. As will be described below, the power consumer may be an electric traction motor propelling at least one wheel of the vehicle, although other alternatives are conceivable. For example, the power consumer may alternatively be an off grid network supplying households, or a construction site having several consumers of different power levels (drills, compressors, heaters, etc.) or industrial consumer like a rock crusher, mills etc.

Moreover, the energy dissipater should be construed as an arrangement which is able to dissipate electric power into a flow of pressurized air. As described above, the energy dissipater comprises an air compressor, and when the air compressor is controlled, using electric power from the electric power source, electric power from the electric power source is dissipated. The energy dissipater is thus in some sense also a power consumer, which consumes power to pressurize the flow of air. Detailed examples of the energy dissipater will be given below.

The inventive concept is based on the insight that the energy dissipater can be operable as a load balancer between the electric power source and the power consumer. In particular, the energy dissipater may be operable to balance a fluctuating load from the power consumer and an electric power source, in particular an electric power source that is not able to, or is not suitable for, regulating its electric power supply instantaneously in response to the change in power consumption of the power consumer. With the above given example of a fuel cell, such fuel cell is in its nature relatively slow in adapting to a rapid change in power consumption. A battery on the other hand can be rapid but rapid changes can be detrimental to the service life of the battery, whereby rapid changes preferably should be avoided.

The inventive concept may thus be advantageously incorporated in a system where the electric power source and the power consumer do not regulate equally fast, and/or where there is no grid to feed power to when there is a surplus of electric energy. Hence, the inventive concept may be advantageously incorporated in a non-stationary equipment, such as a vehicle. Also, and in particular when the electric power source is arranged in the form of a generator of a wind turbine, the energy dissipater may function as an emergency brake in a situation where the wind turbine generator is disconnected from the electrical power grid. In such a case, the energy dissipater may be activated to brake the wind turbine generator by means of dissipating the electricity generated when halting the rotation of the blades of the wind turbine. When the blades are nearly stopped, mechanical brakes of the wind generator can stop the wind turbine blades completely. Thus, the present inventive concept provides for a reduced size or elimination of large, heavy and expensive battery packs with short lifetime for balancing purposes. With the inventive concept, the batteries can both be downsized but also have a much improved durability in the power system.

In some examples, the change in power consumption from the first power level to the second power level may be a reduction of power consumption of the power consumer. As briefly indicated above, the energy dissipater may operate as a balancer for the surplus energy, i.e., the difference between electric power received by the power consumer and the electric power fed by the electric power source.

In some examples, the method may further comprise controlling the electric power source to gradually reduce the supply of electric power to the energy dissipater from the third power level towards zero after determining the reduction of power consumption of the power consumer to the second power level. The electric power source may here gradually adapt to the electric power level consumed by the power consumer. Thus, when the electric power source has reduced the supply to the energy dissipater at an electric power level of zero, the energy dissipater no longer dissipates electric energy.

In some examples, the electric power source may be controlled to initiate the reduction of electric power supply to the energy dissipater after a predetermined time period from determining the reduction of power consumption of the power consumer. The electric power source may hereby be controlled in a safe manner to reduce its electric power supply.

In some examples, the energy dissipater may receive electric power at the third power level simultaneously as the power consumer receives electric power at the second power level. An advantage may be that any surplus of electric energy may relatively instantaneously be managed by the energy dissipater.

In some examples, the change in power consumption from the first power level to the second power level may be an increase in power consumption of the power consumer, the method being preceded by comprising receiving data indicative of a power consumption event of the power consumer at an upcoming point in time at which the power consumer will consume power at a power level corresponding to the second power level, and controlling in response to receiving the data indicative of the power consumption event, the energy dissipater to receive electric power from the electric power source before the power consumption event is initiated.

The electric power source may here ramp up the supply of electric power, where the electric power is fed to the energy dissipater. The ramp up of electric power is preferably a relatively slow process and when the power consumer is initiating its power consumption process at the upcoming point in time, the electric power consumer is up to speed and power at the second power level can be directly is fed to the power consumer, while the energy dissipater reduces its energy dissipation simultaneously. An advantage may be that the electric power source can be operated in an optimized manner where rapid changes in electric power supply can be avoided.

In some examples, the energy dissipater may comprise an electric motor, the electric motor comprising a rotor having a rotor shaft operatively connected to a compressor shaft of the air compressor, wherein the air compressor is electrically connected to the electric power source via the electric motor. The energy dissipater may here dissipate electric power by operation of the electric motor. Thus, the electric power to dissipate is fed to the electric motor, which electric motor uses the electric power to operate the air compressor. Further, in some examples, the electric motor may comprise a stator housing the rotor.

In some examples, the energy dissipater may comprise power electronics electrically connected to the electric motor, the power electronics being configured to receive electric power from the power source, and to feed the electric power to the electric motor. The electric power received from the electric power source when dissipating electric energy is thus preferably fed to the power electronics.

In some examples, the energy dissipater may comprise an air flow channel through which ambient air is configured to be fed to a compressor inlet of the air compressor. In some examples, the air flow channel may be formed by an inner elongated tube and an outer elongated tube, the outer elongated tube being radially spaced apart from the inner elongated tube, wherein the inner elongated tube comprises a first inner surface and a first outer surface, and the outer elongated tube member comprises a second inner surface and a second outer surface, wherein the first outer surface and the second inner surface face each other. A well-defined air flow channel may here be formed.

In some examples, the electric motor may be housed within the inner elongated tube member and attached to the first inner surface. The electric motor may hereby be cooled by the air subsequently pressurized by the air compressor.

In some examples, the power electronics may be arranged inside a power electronics housing, the power electronics housing being attached to the second outer surface. The power electronics may hereby be cooled by the air subsequently pressurized by the air compressor.

By attaching the electric motor and the power electronics to a respective side of the air flow channel directing air to the air compressor, this intake air to the air compressor may be used for cooling both the electric motor as well as the power electronics feeding electric power to the electric motor. A compact and dense solution with increased cooling capacity can thus be provided and the need of using the conventional engine coolant for cooling the electric motor and power electronics is no longer needed for that purpose. Hence, separate air fans or the like can be omitted. Also, since the electric motor and power electronics are cooled off via their attachment on surfaces outside the air flow channel, a reduced risk of debris and particles flowing into these components may be provided. In other words, the coolant air will not be directly in contact with the electric motor and the power electronics. Rather, the electric motor and power electronics will be conductively cooled by the thermal transmission via the surfaces of the inner and outer elongated tube members. The inner and outer elongated tube members are thus preferably made from a thermally conductive material. According to a non-limiting example, the inner and outer elongated tube members are made by aluminum, or other material having a high heat transfer coefficient. Further, and in some examples, the stator may be attached to the first inner surface.

In some examples, the energy dissipater may comprise a cooling structure arranged in the air flow channel. The cooling structure may advantageously increase the coolant of the inner and outer elongated tube members, whereby an increased cooling effect of the electric motor and the power electronics can be obtained. Preferably, and in some examples, the cooling structure may extend along the air flow channel and is attached to at least one of the first outer surface and the second inner surface.

In some examples, the cooling structure may comprise a first plurality of cooling protrusions, the first plurality of cooling protrusions is arranged at the first outer surface and extends towards the second inner surface. The first plurality of cooling protrusions may hereby be attached to the first outer surface, either as integrally formed or connected to the first outer surface by attachment elements. The first plurality of cooling protrusions may hence form part of the first outer surface. The first plurality of cooling protrusions extends towards, but is not in physical contact with, the second inner surface. The first plurality of cooling protrusions hereby increases the coolant towards the electric motor.

In some examples, the cooling structure may comprise a second plurality of cooling protrusions, the second plurality of cooling protrusions is arranged at the second inner surface and extends towards the first outer surface. In a similar vein as the first plurality of cooling protrusions, the second plurality of cooling protrusions may be attached to the second inner surface, either as integrally formed or connected to the second inner surface by attachment elements. The second plurality of cooling protrusions may hence form part of the second inner surface. The second plurality of cooling protrusions extends towards, but is not in physical contact with, the first outer surface. The second plurality of cooling protrusions hereby increases the coolant towards the power electronics.

In some examples, the energy dissipater may comprise an air-cooled resistor, the air-cooled resistor being arranged in downstream fluid communication with the air compressor for receiving a flow of pressurized air. The air-cooled resistor may be advantageously used for dissipating a further amount of electric energy, as well as to increase the temperature of the pressurized air flowing out from the air compressor. Such heated air may subsequently be used for heating various components or structures in the vehicle in need of an increased temperature.

According to a second aspect, there is provided an electric power system, comprising an electric power source, a power consumer electrically connected to the electric power source for consuming power received from the electric power source, an energy dissipater electrically connected to the electric power source, wherein the energy dissipater comprises an air compressor operable by electric power from the electric power source to pressurize a flow of air, and a computer system comprising a processor device coupled to the electric power source and the energy dissipater, wherein the processor device is configured to determine a change in power consumption of the power consumer from a first power level to a second power level; and control, in response to determining the change in power consumption, the energy dissipater to receive electric power from the electric power source at a third power level, the third power level being a difference between the first power level and the second power level.

Effects and features of the second aspect are largely analogous to those described above in relation to the first aspect.

According to a third aspect, there is provided a vehicle comprising an electric power system according to the above defined second aspect.

In some examples, the power consumer may be at least one electric traction motor configured to propel a wheel of the vehicle during propulsion and to generate electric power during braking.

According to a fourth aspect, there is provided a computer program product comprising program code for performing, when executed by the processor device, the method of any of the embodiments described above in relation to the first aspect.

According to a fifth aspect, there is provided a control system comprising one or more control units configured to perform the method according to any of the embodiments described above in relation to the first aspect.

According to a sixth aspect, there is provided a non-transitory computer-readable storage medium comprising instructions, which when executed by the processor device, cause the processor device to perform the method of any of the embodiments described above in relation to the first aspect.

Effects and features of the third, fourth, fifth and sixth aspects are largely analogous to those described above in relation to the first aspect.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

The inventive concept described in the following with reference to the drawings may seek to solve the problem of balancing a fluctuating load from a power consumer and an electric power source. An overall technical advantage of the below disclosure may thus be that a regulation of electric power is obtainable when a change in power consumption occurs, in particularly for an electric power source not able to instantaneously regulate its supply of electric power, or when an electric power source is aged prematurely or destroyed by to rapid power transients.

Figure 1:
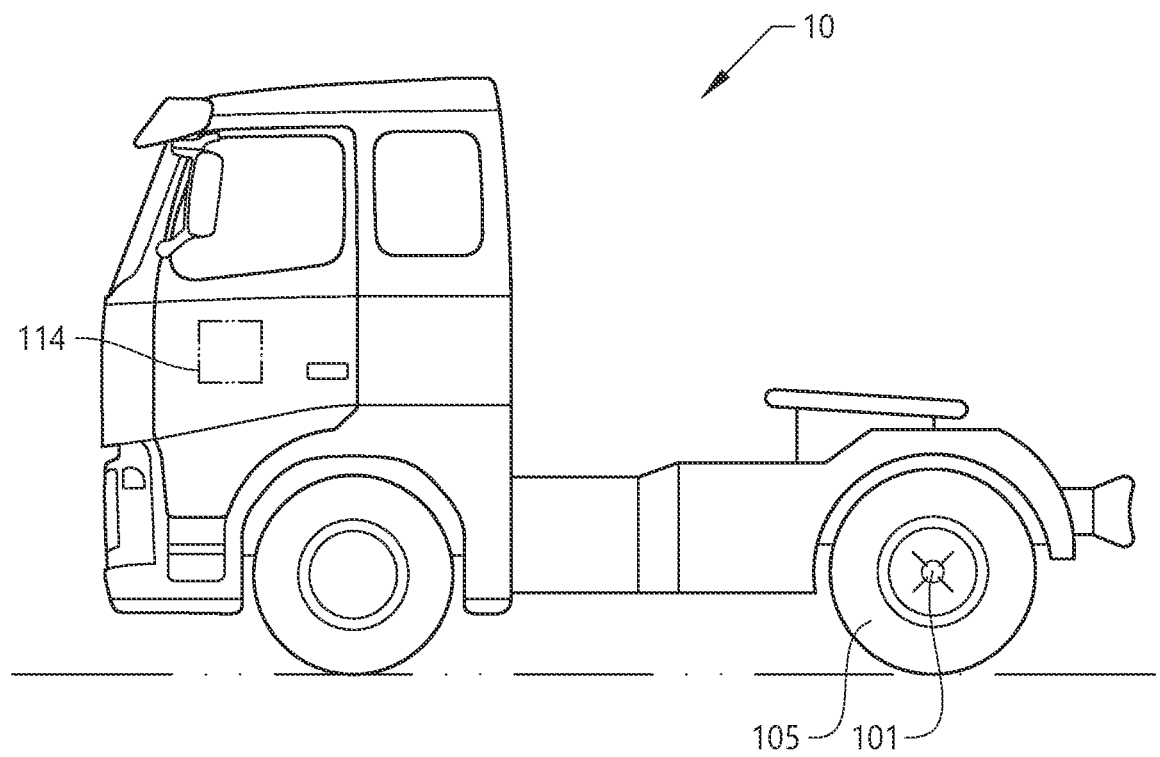
FIG. 1 is an exemplary view of a vehicle in the form of a truck according to one example.

With reference to FIG. 1, there is depicted a vehicle 10 in the form of a truck. The vehicle 10 comprises a power consumer 103, here illustrated in an electric traction motor 101. The traction motor 101 is preferably an electric machine 101 and will in the following be referred to as such. The electric machine 101 is operable to propel at least one pair of wheels 105 of the vehicle 10. As will be evident from the below disclosure, the vehicle also comprises an electric power system of which the power consumer forms part. The vehicle 101 in FIG. 1 also comprises a control unit 114. The control unit 114 comprises a processor device (depicted in further detail in FIG. 6). The processor device is operatively coupled at least to the electric power system, as will be evident below.

The control unit 114 may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit 114 includes a programmable device such as the microprocessor, microcontroller or programmable digital signal processor mentioned above, the processor may further include computer executable code that controls operation of the programmable device.

Figure 2:
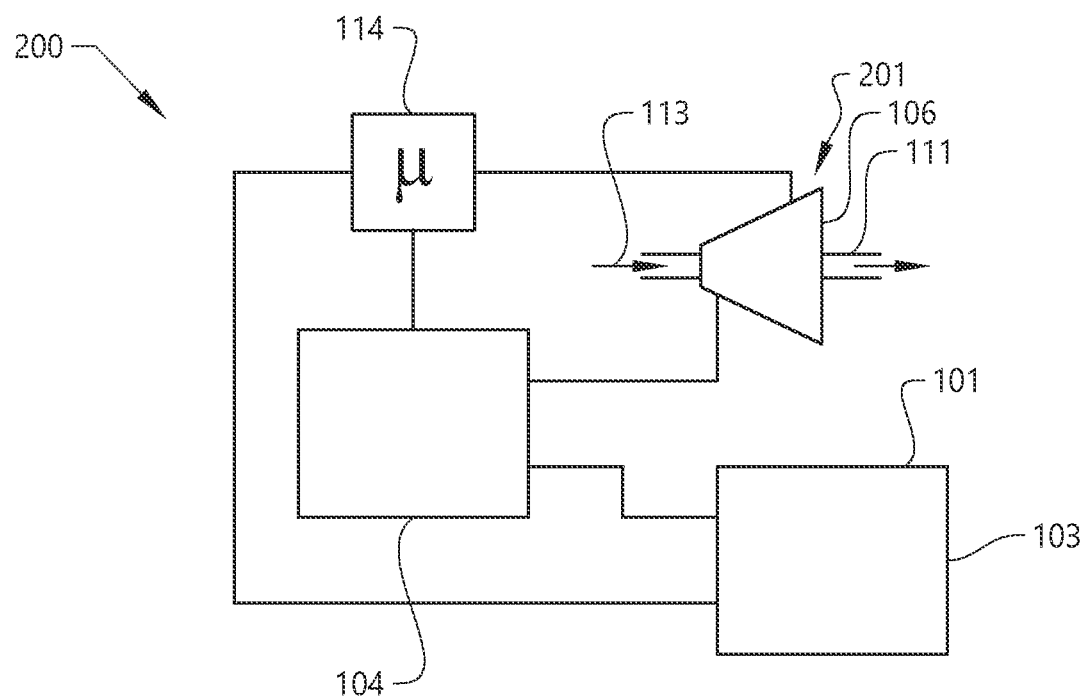
FIG. 2 is an exemplary view of an electric power system according to one example.

Reference is now made to FIG. 2, which is an exemplary view of an electric power system 200 according to one example. As can be seen in FIG. 2, the electric power system 200 comprises an electric power source 104, the above-mentioned power consumer 103, and an energy dissipater 201. The above-described control unit 114 is coupled to each of the electric power source 104, the power consumer 103, and the energy dissipater 201.

The electric power source 104 is electrically connected to the power consumer 103, such that the power source 104 is able to feed electric power to the power consumer 103 for consuming power. With reference to the power consumer 103 in the form of the above-described electric traction motor 101, the electric power source 104 feeds electric power to the electric traction motor 101 when the electric traction motor 101 propels the at least one wheel 105 of the vehicle 10. The electric power source 104 is also electrically connected to the energy dissipater 201. The energy dissipater 201 comprises an air compressor 106 which is operable by electric power received from the electric power source 104. When operated by electric power from the electric power source 104, the air compressor 106 pressurizes a flow of air 113, and feeds the pressurized air to an auxiliary device/structure, such as a device/structure requesting heating in the form of a temperature increase, via an air conduit 111.

During operation of the electric power system 200, which will also be described in further detail below, electric power from the electric power source 104 can be fed to either, or both, of the power consumer 103 and the energy dissipater 201. As will be described in further detail below, the electric power source 104 may be a fuel cell. As another alternative, the electric power source 104 may be a high-voltage energy storage system, such as a high-voltage battery. Hence, the electric power source 104 can be more or less any kind of source from which electric power can be fed.

Figure 3:
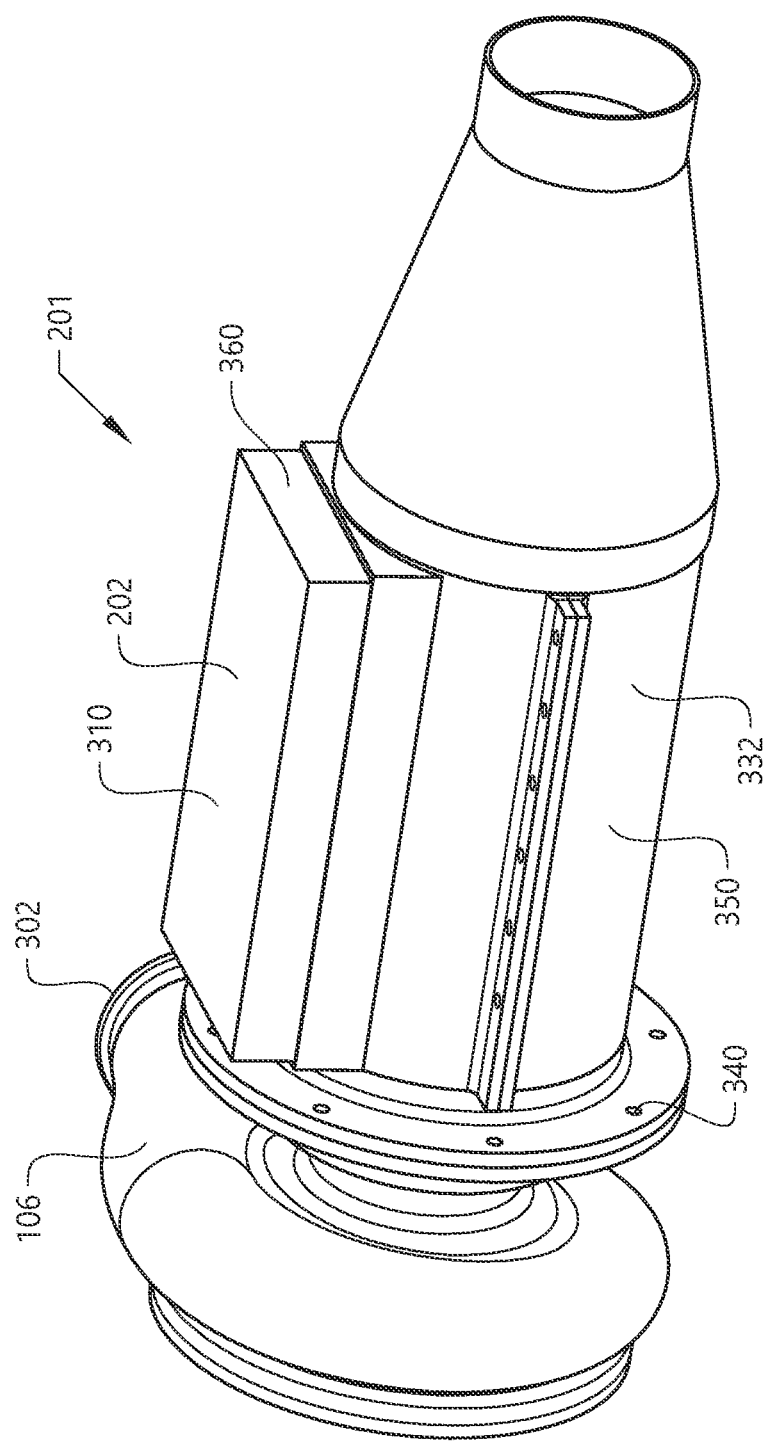
FIG. 3 is a perspective view of an energy dissipater according to one example.
Figure 4:
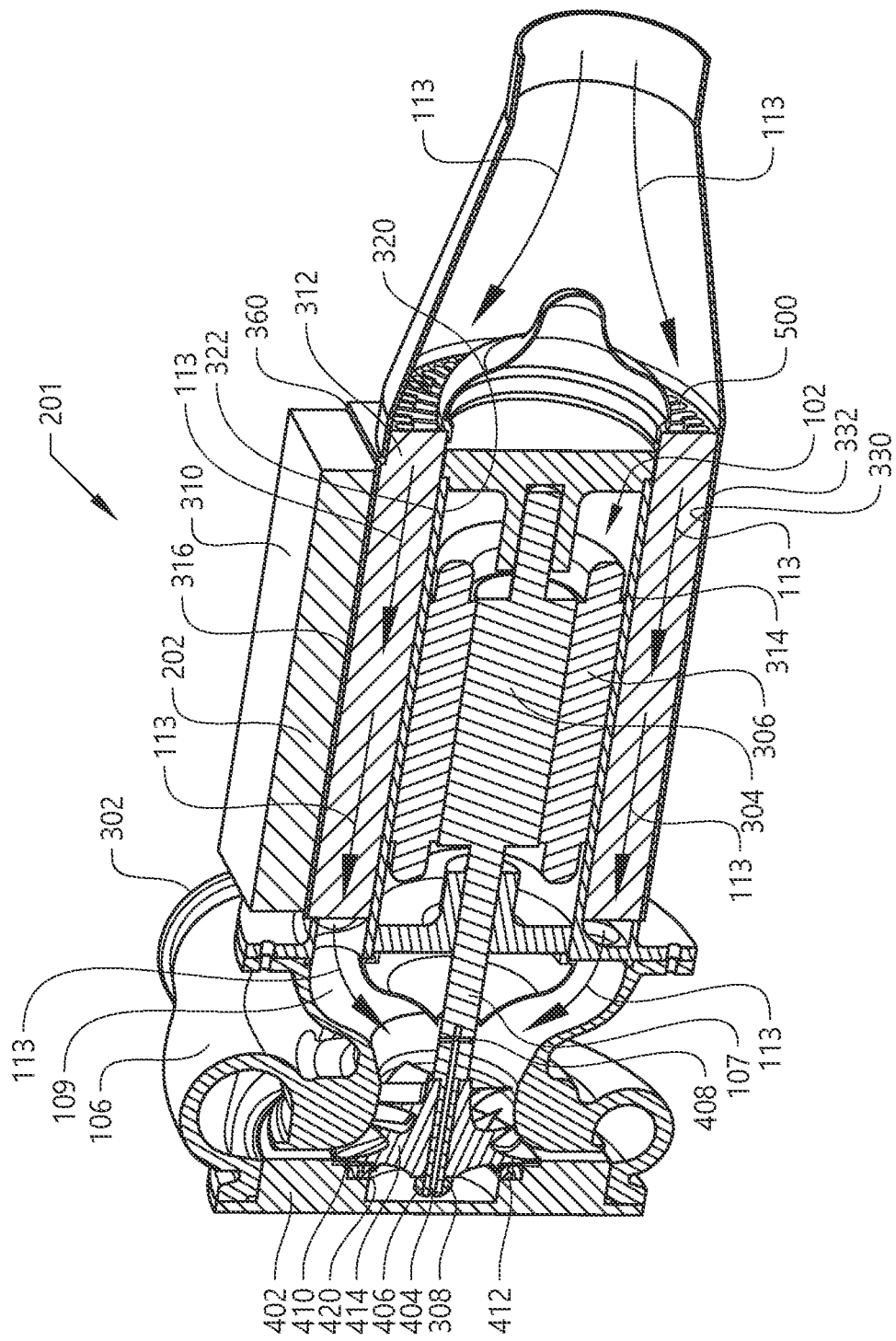
FIG. 4 is a cut-out view of the energy dissipater in FIG. 3 according to one example.

In order to describe an example of the energy dissipater 201 in further detail, reference is made to FIGS. 3-4. FIG. 3 is a perspective view of an energy dissipater according to one example, while FIG. 4 is a cut-out view of the energy dissipater in FIG. 3 according to one example.

The energy dissipater 200 exemplified in FIG. 3 may preferably comprise an electric motor 102 and the above-described air compressor 106. The air compressor 106 comprises a compressor inlet 109 at which ambient air is fed to the air compressor, and an outlet 302 at which pressurized air is fed to the air conduit 111 depicted in FIG. 2.

The electric motor 102 comprises a rotor 304 having a rotor shaft 107. The rotor shaft 107 is operatively connected to a compressor shaft 308 of the compressor 106. Although not depicted in the figures, a gearbox or transmission arrangement may be arranged between the rotor shaft 107 and compressor shaft 308 for increasing/decreasing the rotational ratio between these shafts. The electric motor 102 also comprises a stator 306 housing the rotor 304, i.e., the rotor 304 is arranged radially inside the stator 306. Further, the energy dissipater 202 preferably comprises power electronics 202 configured to receive electric power from the electric power system 104, whereby the power electronics 202 is electrically connected to the electric motor 102 and configured to feed electric power to the electric motor 102 during operation thereof. The power electronics 202 is arranged in a power electronics housing 310.

As can be seen in FIG. 4, the energy dissipater 202 comprises an air flow channel 312 through which ambient air 113 is flowing towards the compressor inlet 109. The air flow channel 312 is formed by an inner elongated tube member 314 and an outer elongated tube member 316, i.e., the air flow channel 312 corresponds to the radial space formed between the inner 314 and outer 316 elongated tube members. Although the inner 314 and outer 316 elongated tube members are illustrated as circular in cross section, other geometric shapes are also conceivable, such as quadratic, rectangular, etc. The air flow channel 312 is thus forming a housing 350 of the electric motor 102, which housing 350 is fixated to the air compressor 106 by suitable attachment elements 340, such as bolts, screws, rivets, etc.

The inner elongated tube member 314 comprises a first inner surface 320 and a first outer surface 322. The first inner surface 320 is facing the electric motor 102, while the first outer surface 322 faces the air flow channel 312, i.e., forms part of the air flow channel 312. The outer elongated tube member 316 comprises second inner surface 330 and a second outer surface 332. The second inner surface 330 is facing the air flow channel 312, i.e., forms part of the air flow channel 312, while the second outer surface 332 is facing the environment of the energy dissipater 202. Accordingly, the first outer surface 322 and the second inner surface 330 faces each other.

As is further evident from FIG. 4, the electric motor 102 is housed within the inner elongated tube member 314. In yet further detail, the electric motor 102, and in particular the stator 306, is attached to the first inner surface 320 of the inner elongated tube member 314. Furthermore, the power electronics housing 310 is on the other hand attached to the second outer surface 332 of the outer elongated tube member 316. The ambient air 113 flowing in the air flow channel 312 will thus conductively cool the electric motor 102 via the inner elongated tube member 314, as well as conductively cool the power electronics housing 310 and in turn the power electronics 202 via the outer elongated tube member 316.

The power electronics housing 310 is preferably attached to the second outer surface 332 at a position radially outside the electric motor 102. Thus, the electric motor 102 and the power electronics 202 will be cooled off at the same time. As can also be seen in FIGS. 3 and 4, the second outer surface 332 comprises a flat surface portion 360 onto which the power electronics housing 310 attached.

Furthermore, the air compressor 106 comprises a lid 402 at a rear end of the air compressor 106, i.e., at an opposite axial end of the air compressor compared to the axial end facing the electric motor 102. Also, the compressor shaft 308 comprises a recirculation channel 404 extending from an axial end position 406 of the compressor shaft 308 and into the compressor inlet 109 via an opening 408. Further, a labyrinth seal 410 is formed in a back plate 412 of the compressor wheel 414, i.e., the labyrinth seal 410 is integrated with the back plate 412. A labyrinth seal member 420 of the labyrinth seal 410 is attached to the lid 402. By means of the labyrinth seal 410, in combination with the recirculation channel 404, the axial pressure exposed to the rotor shaft 107 can be balanced.

Furthermore, in order to increase the cooling capacity of the electric motor 102 and the power electronics 202, the energy dissipater 202 further comprises a cooling structure 500 arranged in the air flow channel 312. As can be seen in FIG. 4, the cooling structure 500 extends along the air flow channel 312, preferably along the entire length of the air flow channel 312. In order to describe this cooling structure in further detail, reference is now made to FIG. 5, which is a radial cross-section of the energy dissipation system 200.

Figure 5:
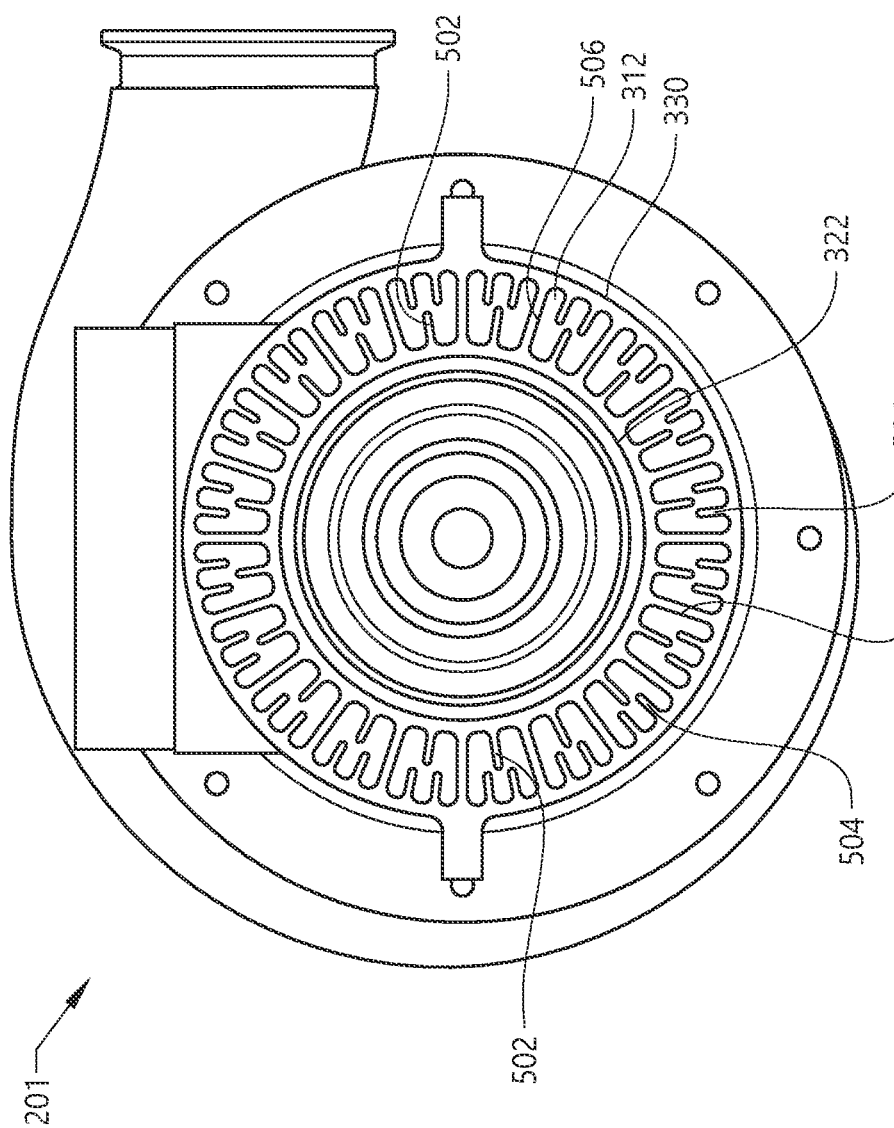
FIG. 5 is a side view in cross-section illustrating the air flow channel of the energy dissipater according to one example.

As can be seen in FIG. 5, the cooling structure 500 comprises a first plurality of cooling protrusions 502. The first plurality of cooling protrusions 502 is arranged at the first outer surface 322. and extends towards the second inner surface 330. Further, the cooling structure 500 also comprises a second plurality of cooling protrusions 504. The second plurality of cooling protrusions 504 is arranged at the second inner surface 330 and extends towards the first outer surface 322. Hence the first 502 and second 504 plurality of cooling protrusions are hence arranged on opposite sides of the air flow channel as seen in the radial direction.

Moreover, and as exemplified in FIG. 5, a number of cooling protrusions of the first plurality of cooling protrusions 502 and a number of cooling protrusions of the second plurality of cooling protrusions 504 are different. According to the non-limiting example in FIG. 5, the number of cooling protrusions of the second plurality of cooling protrusions 504 is higher than the number of cooling protrusions of the first plurality of cooling protrusions 504.

Furthermore, the cooling structure 500 also comprises a third plurality of cooling protrusions 506. Each cooling protrusion of the third plurality of cooling protrusions 506 extends between the first outer surface 322 and the second inner surface 330.

Figure 6:
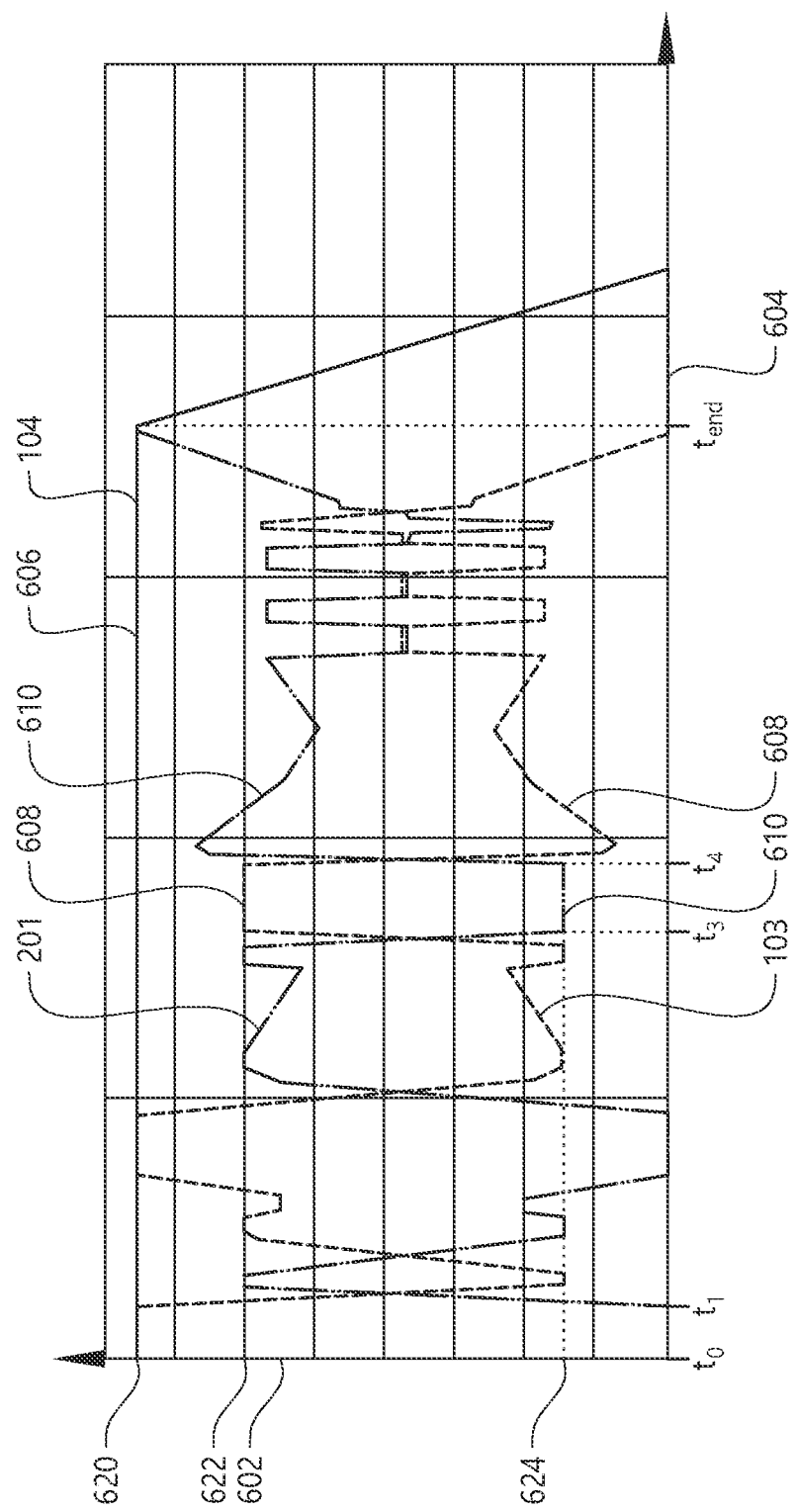
FIG. 6 is a graph illustrating operation of the electric power system according to one example.

Reference is now made to FIG. 6 which is a graph illustrating operation of the electric power system according to one example. The vertical axis 602 represents power level, while the horizontal axis 604 represents an elapsed time of operation. The solid line 606 represents the electric power fed by the electric power source 104, the dashed line 608 represents the variation of electric power consumed by the power consumer 103, and the dashed-dotted line 610 represents the electric energy dissipated by the energy dissipater 201.

As can be seen in FIG. 6, the power consumption of the power consumer 103 varies during the exemplified operation of the electric power system 200. In particular, at a first time period between an initial point in time $T_0$ to a first point in time $t_1$, the power consumer consumes all power provided by the electric power source 104. However, after the first point in time $t_1$, the power consumption of the power consumer is reduced and is subsequently fluctuating during the total time period. As can be seen, when the power consumption of the power consumer 103 reduces and fluctuates, the electric power level fed from the electric power source 104 is maintained at the same power level during a predetermined time period from the initial point in time $t_0$ to an end point in time $t_{end}$. Hence, after the first point in time $t_1$, there are changes in power consumption by the power consumer 103 compared to the power consumption during the first time period.

When the power consumption of the power consumer 103 fluctuates, the energy dissipater 201 is controlled to receive electric power from the electric power source 104. In detail, the change in power consumption by the power consumer 103 is compensated by feeding electric power to the energy dissipater 201. The excess energy, i.e., the difference between the electric power fed by the electric power source 104 and the electric power consumed by the power consumer 103 is dissipated by the energy dissipater 201 by controlling the energy dissipater to pressurize a flow of air into the air conduit 111. Between, for example, a third point in time $t_3$ and a fourth point in time $t_4$, the electric power source feeds electric power at a first power level 620. The power consumption of the power consumer 103 has been reduced to a second power level 622. As can be seen in the time period between the third point in time $t_3$ and the fourth point in time $t_4$, the energy dissipater 201 receives electric power from the electric power source 104 at a third power level 624. The third power level 624 is a difference between the first power level 620 and the second power level 622, i.e., the sum of the second 622 and third 624 power levels corresponds to the first power level 620.

After the end point in time $t_{end}$, i.e., after a predetermined time period from determining the reduction of power consumption of the power consumer, the electric power source is controlled to initiate a reduction of electric power supply to the energy dissipater 201. According to the example in FIG. 6, the electric power source 104 is controlled to gradually reduce the supply of electric power to the energy dissipater 201 towards zero. Hence, the electric power system 104 thus adapts to the level of power consumption of the power consumer 103.

Figure 7:
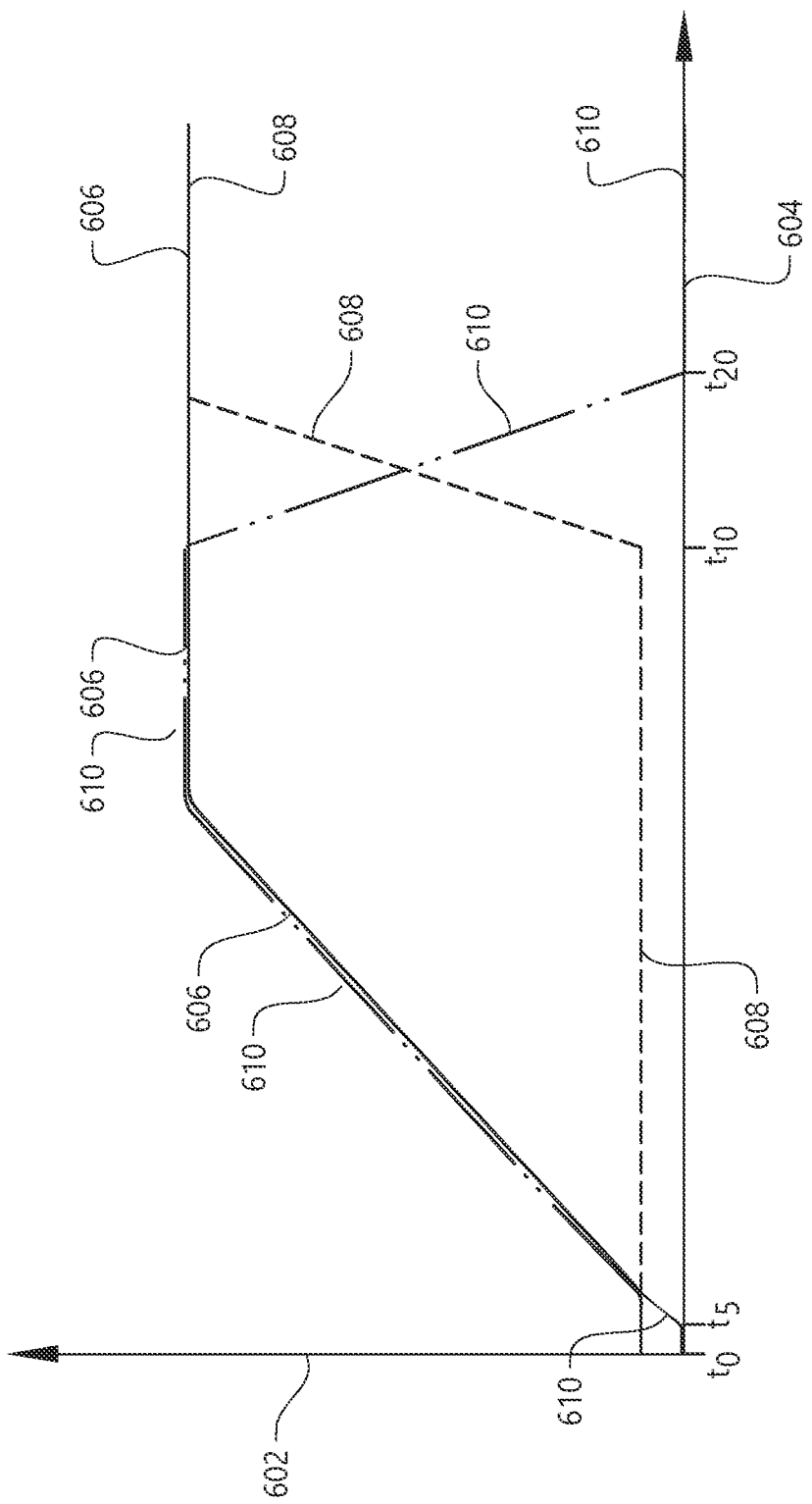
FIG. 7 is a graph illustrating operation of the electric power system according to another example.

Reference is now made to FIG. 7 which is a graph illustrating operation of the electric power system according to another example. In a similar manner as for the FIG. 6 example, the vertical axis 602 represents power level, while the horizontal axis 604 represents an elapsed time of operation. The solid line 606 represents the electric power fed by the electric power source 104, the dashed line 608 represents the variation of electric power consumed by the power consumer 103, and the dashed-dotted line 610 represents the electric energy dissipated by the energy dissipater 201.

As can be seen in FIG. 7, the power consumer 103 is operated to receive a low power level from the electric power source 104 during a time period between $t_0$ to $t_{10}$. The power consumer 103 thus consumes a low level of power during this time period. Although FIG. 7 illustrates that the power consumer 103 consumes power different from zero, it should be understood that the power consumer 103 may consume zero power during this time period. In further detail, the power consumer 103 consumes power at the above described first power level.

During operation, data is received that indicates that the power consumer 103 will obtain a power consumption event. As illustrated in FIG. 7, the power consumer 103 will obtain the power consumption event at an upcoming point in time, illustrated as $t_{10}$. At the upcoming point in time $t_{10}$, the power consumer 103 will initiate a power consumption corresponding to the above described second power level. Although FIG. 7 illustrates a ramp up of electric power consumption of the power consumer 103 until the time period illustrated as $t_{20}$, the increase from the first power level to the second power level may be instantaneous.

When the data indicative of the power consumption event is received, which occurs before the power consumption event is initiated, and depicted as occurring at the point in time $t_5$, the electric power source 104 is increasing its generation of electric power, which power is fed to the energy dissipater. Preferably, and as indicated in FIG. 7, the supply of electric power from the electric power source to the energy dissipater is relatively slowly ramped up to the second power level. The relatively slow increase advantageously avoids transient loads of the electric power source 104.

When the power consumption event is initiated at $t_{10}$, electric power from the electric power source can be directed to the power consumer 103. A reduction of electric power fed to the energy dissipater occurs simultaneously. The FIG. 7 example is thus advantageously preparing for an upcoming operation of the power consumer 103, where the electric power source 104 is up and running before the power consumer 103 requests electric power at the second power level.

The data indicative of the power consumption event may be based on statistics or an assumption that it is likely or expected that the power consumers will increase the total consumption again within shortly. For example, in the event of a restart of a machine again after only a short (for example a minute) shut off for e.g. air filter change or "idle time" waiting for another machine (rocks for the crusher etc.). The above description in relation to FIG. 7 may here be more efficient to implement in order to continue power production with the electric power source over this time.

Figure 8:
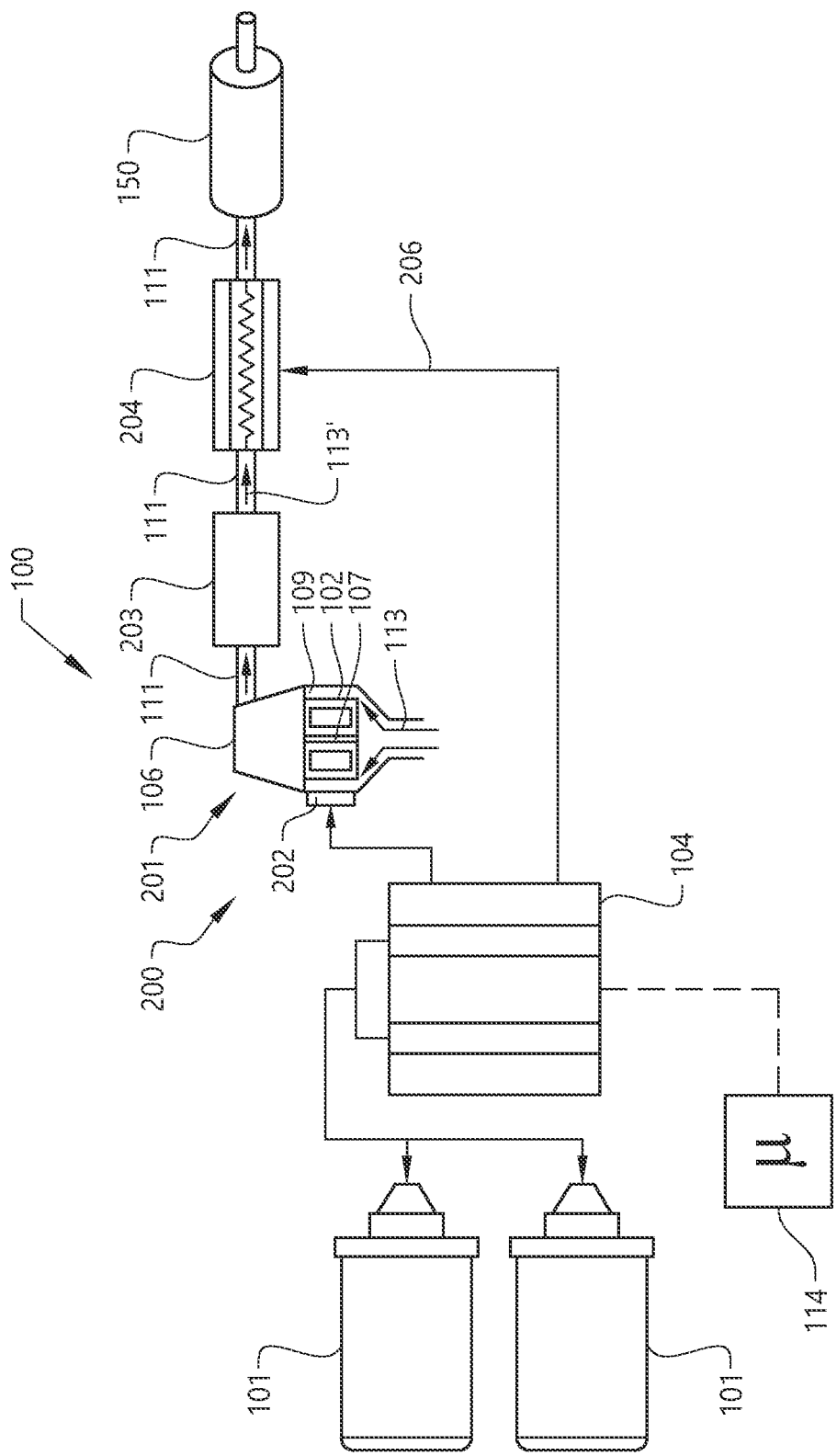
FIG. 8 is an exemplary view of the electric power system incorporated in a vehicle according to one example.

In order to describe the electric power system 200 incorporated in a vehicle system, reference is now made to FIG. 8. FIG. 8 is thus an exemplary view of the electric power system 200 incorporated in a vehicle according to one example. In particular, FIG. 8 illustrates a system according to one example, where electric power is fed from the electric power source 104 to the energy dissipater 201 when power consumption of the power consumer 103 in the form of the above-described electric traction motors fluctuates during braking. The following description of FIG. 8 will thus be referred to as a braking system.

As can be seen in FIG. 8, the system 100 comprises the above-described electric traction motor 101, in FIG. 8 illustrated as a pair of electric traction motors 101. The system 100 further comprises the electric power system 104 which is connected to the electric traction motor(s) 101 for supply of electric power to the electric traction motor(s) 101 when the electric traction motor(s) 101 is/are propelling vehicle 10. The electric power system 104 may also comprise a high-voltage battery (not shown) configured to receive electric power from the electric traction motor(s) 101 when the electric traction motor(s) 101 generates electric power during braking.

The electric power source 104 is depicted as a fuel cell, which is coupled to the electric traction motors 101 as well as to the energy dissipater 202. The fuel cell thus generates electric power and feeds electric power to the electric traction motor(s) 101 when the electric traction motor(s) 101 propel the vehicle 10. Although not depicted in FIG. 2, the source of electric power 104 may comprise various components, such as traction inverters, brake inverters, a junction box, etc.

The above-described control unit 114 is connected to the electric power source 104. The control unit 114 comprises a processor device for controlling operation of the electric power system. The control unit 114 thus receives data from the source of electric power 104, such as e.g., a power level of the electric traction motor(s) 101, etc, and transmits control signals to the electric power source 104.

The system 100 further comprises the above-described energy dissipater 201. The energy dissipater 201 comprises the above-described electric motor 102 and the air compressor 106. The electric motor 102 is connected to the electric power system 104 via power electronics 202, preferably in the form of one or more inverters. As indicated above, the electric motor 102 is thus operated by receiving electric power from the electric power system 104. The electric motor 102 is hence arranged as an electric power dissipater. The air compressor 106 comprises the compressor inlet 109 configured to receive the flow of ambient air 113. The air compressor 106 is configured to pressurize the air and exhaust the pressurized air 113' to an air conduit 111. The pressurized air is hence further fed through the air conduit 111 downstream the air compressor 106. The air compressor 106 is connected to, and operable by, the electric motor 102. As illustrated in FIG. 8, the air compressor 106 is mechanically connected to the electric motor 102 by rotor shaft 107 of the electric motor 102. In further detail, the air compressor 106 is operated by rotation of the rotor shaft 107, which rotation is generated by operating the electric motor 102.

Moreover, the energy dissipater 201 depicted in FIG. 8 also comprises an air-cooled resistor 204. The air-cooled resistor 204 is arranged in the air conduit 111 in downstream fluid communication with the air compressor 106 for receiving a flow of pressurized air. The air-cooled resistor 204 is also electrically connected to, and operable by, the electric power system 104. Thus, also the air-cooled resistor 204 is also arranged as an electric power consumer configured to dissipate electric power. When the air-cooled resistor 204 receives electric power from the electric power system 104, the pressurized air from the air compressor is heated by electrically conductive resistor elements of the air-cooled resistor 204. The pressurized and heated air is thereafter directed towards the ambient environment or other components in need of thermal management. The air from the air-cooled resistor 204 is preferably directed into a muffler 150 of the system 100. The muffler 150 reduces noise and can also provide a pressure drop of the air.

According to the exemplified embodiment in FIG. 8, the system 100 optionally comprises a flow restriction arrangement 203 in the air conduit 111. The flow restriction arrangement 203 is arranged in downstream fluid communication with the air compressor 106 and configured to increase the pressure level of the flow of air exhausted by the air compressor 106.

Although not depicted in FIG. 8, it should be readily understood that the control unit 114 can be connected to other components in addition to the connection to the electric power system 104. For example, the control unit 114 may be connected to the electric traction motor(s) 101, the electric motor 102, as well as connected to an upper layer vehicle control system (not shown), etc.

Figure 9:
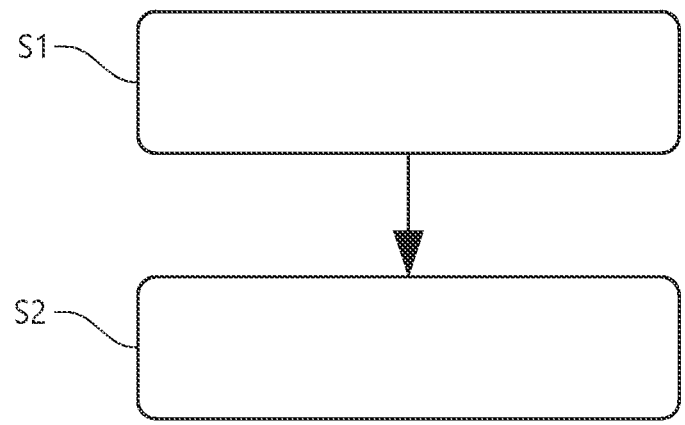
FIG. 9 is a flow chart of a method of controlling an electric power system according to one example.

Reference is now made to FIG. 9 for a brief sum up of operating the electric power system 200 according to an example. FIG. 9 is a flow chart of a method of controlling an electric power system according to one example. The below description of FIG. 9 can preferably be in conjunction with the illustration of FIG. 6 for simplified understanding.

During operation, electric power is fed from the electric power source 104 to the power consumer 103 for operating the power consumer. When there is a change in power consumption of the power consumer 103, the control unit 114 determines S1 that the power consumption of the power consumer 103 is changed from a first power level 620 to a second power level 622. In response to determining the change in power consumption, the control unit 114 controls S2 the energy dissipater 103 to receive electric power from the electric power source 104 at a third power level 624. The third power level 624 is corresponding to the difference between the first power level 620 and the second power level 622, i.e., the first power level 620 corresponds to the sum of the second 622 and third 624 power levels.

Figure 10:
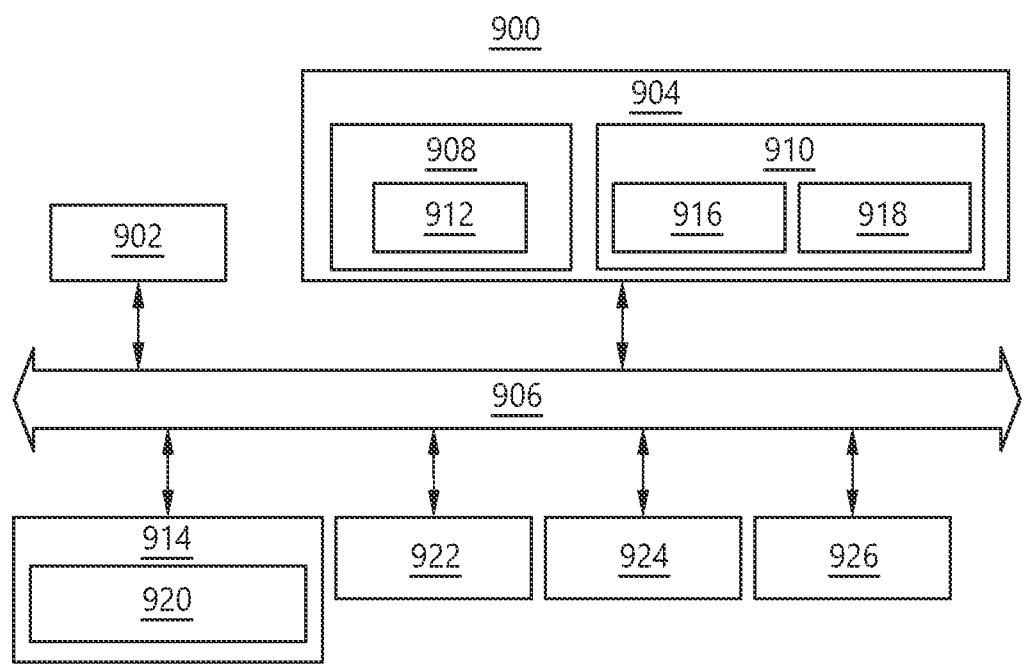
FIG. 10 is a schematic diagram of an exemplary computer system for implementing examples disclosed herein, according to one example.

Turning now to FIG. 10 which is a schematic diagram of a computer system 900 for implementing examples disclosed herein. The computer system 900 is adapted to execute instructions from a computer-readable medium to perform these and/or any of the functions or processing described herein. The computer system 900 may be connected (e.g., networked) to other machines in a LAN, an intranet, an extranet, or the Internet. While only a single device is illustrated, the computer system 900 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 900 may comprise at least one computing device or electronic device capable of including firmware, hardware, and/or executing software instructions to implement the functionality described herein. The computer system 900 may include a processor device 902 (may also be referred to as a control unit), a memory 904, and a system bus 906. The computer system 900 may include at least one computing device having the processor device 902. The system bus 906 provides an interface for system components including, but not limited to, the memory 904 and the processor device 902. The processor device 902 may include any number of hardware components for conducting data or signal processing or for executing computer code stored in memory 904. The processor device 902 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 906 may be any of several types of bus structures that may further interconnect to a memory bus (with or without a memory controller), a peripheral bus, and/or a local bus using any of a variety of bus architectures. The memory 904 may be one or more devices for storing data and/or computer code for completing or facilitating methods described herein. The memory 904 may include database components, object code components, script components, or other types of information structure for supporting the various activities herein. Any distributed or local memory device may be utilized with the systems and methods of this description. The memory 904 may be communicably connected to the processor device 902 (e.g., via a circuit or any other wired, wireless, or network connection) and may include computer code for executing one or more processes described herein. The memory 904 may include non-volatile memory 908 (e.g., read-only memory (ROM), erasable programmable read-only memory (EPROM), electrically erasable programmable read-only memory (EEPROM), etc.), and volatile memory 910 (e.g., random-access memory (RAM)), or any other medium which can be used to carry or store desired program code in the form of machine-executable instructions or data structures and which can be accessed by a computer or other machine with a processor device 902. A basic input/output system (BIOS) 912 may be stored in the non-volatile memory 908 and can include the basic routines that help to transfer information between elements within the computer system 900.

The computer system 900 may further include or be coupled to a non-transitory computer-readable storage medium such as the storage device 914, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 914 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 914 and/or in the volatile memory 910, which may include an operating system 916 and/or one or more program modules 918. All or a portion of the examples disclosed herein may be implemented as a computer program product 920 stored on a transitory or non-transitory computer-usable or computer-readable storage medium (e.g., single medium or multiple media), such as the storage device 914, which includes complex programming instructions (e.g., complex computer-readable program code) to cause the processor device 902 to carry out the steps described herein. Thus, the computer-readable program code can comprise software instructions for implementing the functionality of the examples described herein when executed by the processor device 902. The processor device 902 may serve as a controller or control system for the computer system 900 that is to implement the functionality described herein.

The computer system 900 also may include an input device interface 922 (e.g., input device interface and/or output device interface). The input device interface 922 may be configured to receive input and selections to be communicated to the computer system 900 when executing instructions, such as from a keyboard, mouse, touch-sensitive surface, etc. Such input devices may be connected to the processor device 902 through the input device interface 922 coupled to the system bus 906 but can be connected through other interfaces such as a parallel port, an Institute of Electrical and Electronic Engineers (IEEE) 1394 serial port, a Universal Serial Bus (USB) port, an IR interface, and the like. The computer system 900 may include an output device interface 924 configured to forward output, such as to a display, a video display unit (e.g., a liquid crystal display (LCD) or a cathode ray tube (CRT)). The computer system 900 may also include a communications interface 926 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

The invention claimed is:

1. A method of controlling an electric power system, the electric power system comprising:
   an electric power source;
   a power consumer electrically connected to the electric power source for consuming power received from the electric power source; and
   an energy dissipater electrically connected to the electric power source, wherein the energy dissipater comprises an air compressor operable by electric power from the electric power source to pressurize a flow of air;
   the method comprising:
   determining a change in power consumption of the power consumer from a first power level to a second power level; and
   controlling, in response to determining the change in power consumption, the energy dissipater to receive electric power from the electric power source at a third power level, the third power level being a difference between the first power level and the second power level, wherein the energy dissipater receives electric power at the third power level simultaneously as the power consumer receives electric power at the second power level.

2. The method of claim 1, wherein the change in power consumption from the first power level to the second power level is a reduction of power consumption of the power consumer.

3. The method of claim 2, the method further comprising:
   controlling the electric power source to gradually reduce the supply of electric power to the energy dissipater from the third power level towards zero after determining the reduction of power consumption of the power consumer to the second power level.

4. The method of claim 3, wherein the electric power source is controlled to initiate the reduction of electric power supply to the energy dissipater after a predetermined time period from determining the reduction of power consumption of the power consumer.

5. The method of claim 1, wherein the change in power consumption from the first power level to the second power level is an increase in power consumption of the power consumer, the method being preceded by comprising:
   receiving data indicative of a power consumption event of the power consumer at an upcoming point in time at which the power consumer will consume power at a power level corresponding to the second power level; and
   controlling in response to receiving the data indicative of the power consumption event, the energy dissipater to receive electric power from the electric power source before the power consumption event is initiated.

6. The method of claim 1, wherein the energy dissipater comprises an electric motor, the electric motor comprising a rotor having a rotor shaft operatively connected to a compressor shaft of the air compressor, wherein the air compressor is electrically connected to the electric power source via the electric motor.

7. The method of claim 6, wherein the energy dissipater comprises an air flow channel through which ambient air is configured to be fed to a compressor inlet of the air compressor.

8. The method of claim 7, wherein the air flow channel is formed by an inner elongated tube and an outer elongated tube, the outer elongated tube being radially spaced apart from the inner elongated tube, wherein the inner elongated tube comprises a first inner surface and a first outer surface, and the outer elongated tube member comprises a second inner surface and a second outer surface, wherein the first outer surface and the second inner surface face each other.

9. The method of claim 8, wherein the electric motor is housed within the inner elongated tube member and attached to the first inner surface.

10. The method of claim 8, wherein the power electronics is arranged inside a power electronics housing, the power electronics housing being attached to the second outer surface.

11. The method of claim 1, wherein the energy dissipater comprises an air-cooled resistor, the air-cooled resistor being arranged in downstream fluid communication with the air compressor for receiving a flow of pressurized air.

12. A computer program product comprising program code for performing, when executed by the processor device, the method of claim 1.

13. A control system comprising one or more control units configured to perform the method of claim 1.

14. A non-transitory computer-readable storage medium comprising instructions, which when executed by a processor device, cause the processor device to perform the method of claim 1.

15. An electric power system, comprising:
an electric power source;
a power consumer electrically connected to the electric power source for consuming power received from the electric power source;
an energy dissipater electrically connected to the electric power source, wherein the energy dissipater comprises an air compressor operable by electric power from the electric power source to pressurize a flow of air; and
a computer system comprising a processor device coupled to the electric power source and the energy dissipater, wherein the processor device is configured to:
determine a change in power consumption of the power consumer from a first power level to a second power level; and
control, in response to determining the change in power consumption, the energy dissipater to receive electric power from the electric power source at a third power level, the third power level being a difference between the first power level and the second power level, wherein the energy dissipater receives electric power at the third power level simultaneously as the power consumer receives electric power at the second power level.

16. A vehicle comprising the electric power system of claim 15.

* * * * *